US007427654B1

(12) United States Patent
Cheng et al.

(10) Patent No.: US 7,427,654 B1
(45) Date of Patent: Sep. 23, 2008

(54) DEGRADABLE POLYMIDES

(75) Inventors: Guanglou Cheng, Mayagüez, PR (US); Maria Aponte, Anasco, PR (US); Carlos A. Ramírez, Mayagüez, PR (US)

(73) Assignee: University of Puerto Rico, San Juan, PR (US)

( * ) Notice: Subject to any disclaimer, the term of this patent is extended or adjusted under 35 U.S.C. 154(b) by 0 days.

(21) Appl. No.: 10/964,480

(22) Filed: Apr. 22, 2005

Related U.S. Application Data

(60) Provisional application No. 60/512,465, filed on Oct. 17, 2003.

(51) Int. Cl.
*C08G 73/10* (2006.01)
*C08G 69/26* (2006.01)

(52) U.S. Cl. ........................... 528/170; 528/353

(58) Field of Classification Search ................. 528/170, 528/353
See application file for complete search history.

(56) References Cited

U.S. PATENT DOCUMENTS

| | | | | |
|---|---|---|---|---|
| 3,622,525 | A * | 11/1971 | Miller | 521/157 |
| 4,343,931 | A | 8/1982 | Barrows | |
| 4,874,834 | A * | 10/1989 | Higashi et al. | 528/176 |
| 5,714,573 | A | 2/1998 | Randall et al. | |
| 5,756,650 | A * | 5/1998 | Kawamonzen et al. | 528/353 |
| 6,586,555 | B1 * | 7/2003 | Ishihara et al. | 528/170 |
| 6,686,437 | B2 | 2/2004 | Buchman et al. | |

FOREIGN PATENT DOCUMENTS

JP    05339373    A  *  12/1993

OTHER PUBLICATIONS

C. E. Sroog, A. L. Endrey, S. V. Abramo, C. E. Berr, W. M. Edwards, and K. L. Olivier; Aromatic Polypyromellitimides from Aromatic Polyamic Acids; *Journal of Polymer Science*; 1965; pp. 1373-1390; USA.
Harlan C. Amstutz and Maurice Lodwig; Wear of Polymeric Bearing Materials: the Effects of In Vivo Implantation; *J. Biomed, Mater. Res.*; 1976; pp. 24-31; USA.
K. L. Mittal; proceedings of the First Technical Conference on Polymides/Synthesis, Characterization, and Applications held under the auspices of the Mid-Hudson Section of the Society of Plastics Engineers; 1982; USA.
K. L. Mittal; proceedings of the Second Technical Conference on Polymides/Synthesis, Characterization, and Applications held under the auspices of the Mid-Hudson Section of the Society of Plastics Engineers; 1982; USA.
Cladius Feger, Mahmoud M. Khojasteh and James E. McGrath; proceedings of the Third Technical Conference on Polymides; 1989; USA.
Holly Susan Haggerty and Hugh S. Lusted; Histological Reaction to Polyimide Films in the Cochlea; *Acta Otolaryngol (Stockh)*; 1989; pp. 13-22; USA.
Mark Chasin, and Robert Langer; *Biodegradable Polymers as Drug Delivery Systems*; Marcel Dekker, Inc.; 1990; USA.
D. Wilson; H. D. Stenzenberger and P. M. Hergenrother; *Polyimides*; Blackie & Son, Ltd., 1990; USA.
J. Edward Glass; Plastic Degradability and Agricultural Product Utiization; *ACS Symposium Series*; 1990; pp. 52-57; USA.
Luis E. Cuebas, Carlos A. Ramirez, Maria A. Aponte and Gustavo V. Barbosa-Canovas; In Vitro degradation and solute release from erodible polyanhydride supprts containing skeletal β-alanine residues; *Journal of Controlled Release*; 1992; pp. 145-152; USA.
Robert A. Jesinger and Virginia L. Stonick; *Functional Architecture for a Retinal Prosthesis*; IEEE Engineering in Medicine International Conference Proceedings; 1993; USA.
Jeffrey O. Hollinger; *Biomedical Applications of Synthetic Biodegradable Polymers*; CRC Press; 1995; USA.
R. R. Richardson, Jr., J. A. Miller and W. M. Reichart; Polyimides as biomaterials: preliminary biocompatibility testing; Biomaterials; 1993; pp. 627-635; USA.
D. W. Grijpma, E. Kroeze, A. Nijenhuis and A. J. Pennings; Poly(L-lactide) crosslinked with spiro-bis-dimethylene-carbonate; Polymer; 1993; pp. 1496-1503; USA.
Severian Dumitru; Polymeric Biomaterials; Marcel Dekker, Inc.; 1994; USA.
Robert W. Bucholz, Stephen Henry and M. Bradford Henley; Fixation with Bioabsorbable Screws for the Treatment of Fractures of the Ankle; *The Journal of Bone and Joint Surgery*; 1994; pp. 319-324; USA.
Kathryn E. Uhrich, Anita Gupta, Tommy T. Thomas, Cato T. Laurencin, and Robert Langer; Synthesis and Characterization of Degradable Poly(anhydride-co-imides); *American Chemical Society*; 1995; pp. 2184-2193; USA.
Mohamed A. Attawia, Kathryn E. Uhrich, Edward Botchway, Miranda Fan, Robert Langer, and Cato T. Laurencin; Cytotoxicity testing of poly(anhydride-co-imides) for orthopedic applications; *Journal of Biomedical Materials research*; 1995; pp. 1233-1240; USA.

(Continued)

*Primary Examiner*—Irina S Zemel
(74) *Attorney, Agent, or Firm*—Hoglund & Pamias, PSC; Robert J Rios

(57) ABSTRACT

Degradable polyimides are prepared in high yield by polymerizing a monomer containing at least two anhydride groups, and a monomer containing at least two primary amine groups and at least one acidic group, in bulk or in a solvent. The polyimides are very strong in terms of their mechanical properties, yet degradable under standard physiological conditions.

6 Claims, 1 Drawing Sheet

OTHER PUBLICATIONS

Malay K. Ghosh and K. L. Mittal; *Polymides Fundamentals and applications*; Marcel Dekker, Inc.; 1996; USA.

Mari Hiljanen-Vainio, Markku Heino and Jukka V. Seppälä; Reinforcement of biodegradable poly(ester-urethane) with fillers; Polymer; 1998; pp. 865-872; Finland.

Dina Svaldi Muggli, Amy K. Burkoth, and Kristi S. Anseth; *Crosslinked polyanhydrides for use in orthopedic applications: Degradation behavior and mechanics*; John Wiley & Sons; 1999; pp. 271-278; USA.

Amy K. Burkoth and Kristi S. Anseth; *Photocurable Polyanhydrides Engineered for Orthopaedic Applications*; Department of Chemical Engineering, University of Colorado; 1999; pp. 566-567; USA.

Dina Svaldi Muggli, Amy K. Burkoth, and Kristi S. Anseth; *Crosslinked polyanhydrides for use in orthopedic applications; Degradation behavior and mechanics*; John Wiley & Sons, Inc., 1999; pp. 271-278; USA.

Michael I. Bessonov, and Vladimir A. Zubkov; Polyamic Acids and Polyimides/Synthesis, Transformations, and Structure; CRC Press; 1993; pp.

American Chemical Society; *Polymeric Materials: Science and engineering*; Fall Meeting Proceedings of the American Chemical Society Division of Polymeric Materials: Science and Engineering; 2000; USA.

Guanglou Cheng, Maria A. Aponte, and Carlos A. Ramirez; Synthesis and Characterization of Cross-linked amino Acid-containing Polyanhydrides for Controlled Drug Release Applications; *Polymeric Materials: Science & Engineering*; 2003; pp. 618-619; USA.

E. Ingham and J. Fisher; Biological reactions to wear debris in total joint replacement; *Proc Instn Mech Engrs*; 2000; pp. 21-37; USA.

Health World; Medline, Medical Research & Document Delivery; *Infotrieve*; 2002; pp. 1-2; USA.

M. Kanno, H. Kawakami, S. Nagaoka, S. Kubota; *Biocompatibility of fluorinated polyimide*; John Wiley & Sons, Inc.; 2001; pp. 53-60; Japan.

E. S. Stevens; *Green Plastics/An Introduction to the New Science of Biodegradable Plastics*; Princeton University Press; 2002; USA.

Yadong Wang, Guillermo A. Ameer, Barbara J. Sheppard, and Roberto Langer: A tough biodegradable elastomer; *Nature Biotechnology*; 2002; pp. 602-606; USA.

Guanglo Cheng, Maria A. Aponte, and Carlos A. Ramirez; *Crosslinked Amino Acid-Containining Polyanhydrides for Controlled Drug Release Applications*; Controlled Release Society 30th Annual Meeting Proceedings; 2003; 2 pages; USA.

Marston Taylor Bogert and Roemer Rex Renshaw; 4-Amino-0-Phthalic Acid and Some of its Derivatives; 1908; pp. 1135-1144; USA.

American Chemical Society; *Polymeric Materials: Science and engineering*; Fall Meeting Proceedings of the American Chemical Society Division of Polymeric Materials: Science and Engineering; 2003; USA.

Chiellini, E., Cinelli, P., D'Antone, S., Ilieva, V.I.; "Environmentally degradable polymeric materials (EDPM) in agricultural applications—an overview", Polimery (Warsaw, Poland) 2002, 47, 538-544.

Scott, G.; Degradable Polymers: Principles and Applications, 2nd ed.; Kluwer Academic Publishers; 2003.

Kohn, D. H.; Ducheyne, P.; In Materials Science and Technology; Cahn, R.; Haasen, P.; Kramer, E., eds.; VCH: New York, NY 1992; vol. 14, pp. 29-109.

Attawia, M. A.; Uhrich, K.E.; Botchwey, E.; Langer, R.; Laurencin, C. T.; "In vitro bone biocompatibility of poly(anhydride-co-imides) containing pyromellitylimidalanine", J. Orthop. Res.; 1996; 14, 445-454.

Muggli, D. S.; Burkoth, A. K.; Anseth, K.S.; Crosslinked polyanhydrides for use in orthopedic applications: Degradation behavior and mechanics:, Journal of Biomedical Materials Research 1999, 46, 271-278.

Sroog, C. E.; "Polyimides", Prog. Polym. Sci. 1991, 16, 561-694.

Mittal, K. L.; Polyimides: Synthesis, Characterization, and Applications; Plenum Press; New York, NY; 1984.

Smith, C. D.; Mercier, R.; Waton, H.; Sillion, B., "Solution hydrolytic stability of aromatic imide materials by fluorine-19 NMR", Polymer Preprints (American Chemical Society, Division of Polymer Chemistry) 1994, 35, 359-360.

Korshak, V. V.; Vinogradova, S. V.; Vygodskii, Y. S.; Gerashchenko, Z. V.; Lushkina, N. I., "Hydrolytic stability of some polyimides", Vysokomolekulyarnye Soedineniya, Seriya A 1972, 14, 1924-1928.

Stieglitz, T.; Meyers, J. U., "Implantable microsystems. Polyimide-based neuroprostheses for interfacing nerves", Med Device Technol 1999, 10, 28-30.

* cited by examiner

DEGRADABLE POLYMIDES

BACKGROUND OF THE INVENTION

The field of biodegradable polymers is a fast growing area of polymer science because they can be used in many medical applications, and they do not produce wastes to the environment. These polymers can degrade ultimately into small molecules which are biocompatible or environmentally friendly, thus making them part of the natural cycle. This obviates the management problem of waste disposal, and is an advantage over other non-degradable systems where recycling of the latter is impractical or uneconomical. Various types of biodegradable polymers, including polyesters, polyamides, polyanhydrides, polyacetals, poly(ortho ester)s, polyorganophosphazenes, and polyurethanes, have been developed for agricultural, biological, and other industrial applications, such as adhesives, coatings, packaging, food storage, and consumer products. However, development of novel biodegradable polymers continues at an accelerated pace, especially where superior mechanical, electronic, and optical properties are desired.

To illustrate the ideas presented above, various polymeric biomaterials, including poly(methyl methacrylate) (PMMA) bone cement, ultra high molecular weight polyethylene (UHMWPE), polyesters, crosslinked polyesters, filler toughening polyesters, polyesteramides, amino acid containing polyanhydrides, crosslinked polyanhydrides, crosslinked elastomer, and crosslinked amino acid containing polyanhydrides have been developed for orthopaedic applications. Among these materials, PMMA bone cement has the highest compression strength of 70-90 MPa, which is still far below the compression strength of cortical bone (130-220 MPa). Bone cement is non-degradable, which may hinder healing and bone ingrowth. The wear debris of non-biodegradable orthopaedic biomaterials may also cause side reactions such as inflammation and osteolysis. Therefore, there is a need for new orthopaedic biopolymers with adequate degradability and superior mechanical and wear-resistant properties.

Polyimides are a promising class of biomaterials since they have been used in many applications for nearly 40 years. The first polyimide was synthesized by Bogert and Renshaw in 1908, and the first commercialized polyimide (Kapton) was introduced by Dupont in 1965. More recently, polyimides have been widely used as engineering plastics in load-bearing applications (aerospace and automobile industries), chemical industries (matrix resins, adhesives, coatings, and gas separations), microelectronics, photonics, and optics due to their excellent mechanical properties, chemical inertness, superior thermal stability, low dielectric constant, low coefficient of thermal expansion, good processability, high wear/radiation resistance, and long-term durability. Superior hydrolytic stability of aromatic polyimides was also demonstrated by the retention of polyimide film flexibility in boiling water. Biocompatibility of various commercial aromatic polyimides has also been known for many years, and some non-degradable polyimides were also developed very recently for medical implantation. In spite of their large potential in agricultural, biological, pharmaceutical, and industrial applications, their development has been limited due to their nondegradability.

Additional background information may be found in the following references, all of which are incorporated herein by reference in their entirety:

1. Chiellini, E.; Cinelli, P.; D'Antone, S.; Ilieva, V. I. "Environmentally degradable polymeric materials (EDPM) in agricultural applications—an overview", *Polimery* (Warsaw, Poland) 2002, 47, 538-544.
2. Glass, J. E. "Plastic degradability and agricultural product utilization", *ACS Symposium Series* 1990, 433, 52-57.
3. Hollinger, J. O. *Biomedical Applications of Synthetic Biodegradable Polymers*; CRC Press: Boca Ratón, FL, 1995.
4. Chasin, M.; Langer, R. *Biodegradable Polymers as Drug Delivery Systems*; Marcel Dekker, Inc., New York, N.Y., 1990.
5. Dumitriu, S. *Polymeric Biomaterials*; Marcel Dekker, Inc., New York, N.Y., 1994.
6. Stevens, E. S. *Green Plastics: An Introduction to the New Science of Biodegradable Plastics*; Princeton University Press, Princeton, N.J., 2001.
7. Scott, G. *Degradable Polymers: Principles and Applications,* 2nd ed.; Kluwer Academic Publishers, 2003.
8. Kohn, D. H.; Ducheyne, P. In *Materials Science and Technology*; Cahn, R.; Haasen, P.; Kramer, E., eds.; VCH: New York, N.Y., 1992; Vol. 14, pp 29-109.
9. Ingham, E.; Fisher, J. "Biological reactions to wear debris in total joint replacement", *Proc Inst Mech Eng* 2000, 214, 21-37.
10. Bucholz, R. W.; Henry, S.; Henley, M. B. "Fixation with bioabsorbable screws for the treatment of fractures of the ankle", *J Bone Joint Surg Am* 1994, 76, 319-324.
11. Grijpma, D. W.; Kroeze, E.; Nijenhuis, A. J.; Pennings, A. J. "Poly(L-lactide) crosslinked with spiro-bisdimethylene-carbonate", *Polymer* 1993, 34, 1496-1503.
12. Hiljanen-Vainio, M.; Heino, M.; Seppala, J. V. "Reinforcement of biodegradable poly(ester-urethane) with fillers", *Polymer* 1998, 39, 865-872.
13. Randal, J. R.; Ryan, C. M.; Lunt, J.; Hartman, M. H. In U.S. Pat. No. 5,714,573; Cargill, 1995.
14. Barrows, T. S.; Minnesta Mining & MFG: U.S. Pat. No. 4,343,931, 1982.
15. Uhrich, K. E.; Gupta, A.; Thomas, T. T.; Laurencin, C. T.; Langer, R. "Synthesis and characterization of degradable poly(anhydride-co-imides)", *Macromolecules* 1995, 28, 2184-2193.
16. Attawia, M. A.; Uhrich, K. E.; Botchwey, E.; Fan, M.; Langer, R.; Laurencin, C. T. "Cytotoxicity testing of poly (anhydride-co-imides) for orthopedic applications", *J. Biomed. Mater. Res.* 1995, 29, 1233-1240.
17. Attawia, M. A.; Uhrich, K. E.; Botchwey, E.; Langer, R.; Laurencin, C. T. "In vitro bone biocompatibility of poly (anhydride-co-imides) containing pyromellitylimidoalanine", *J. Orthop. Res.* 1996, 14, 445-454.
18. Cuebas, L. E.; Ramirez, C. A.; Aponte, M. A.; Barbosa-Cánovas, G. V. "In vitro degradation and solute release from erodible polyanhydride supports containing skeletal β-alanine residues", *J. Controlled Release* 1992, 18, 145-151.
19. Muggli, D. S.; Burkoth, A. K.; Anseth, K. S. "Crosslinked polyanhydrides for use in orthopedic applications: Degradation behavior and mechanics", *Journal of Biomedical Materials Research* 1999, 46, 271-278.
20. Burkoth, A. K.; Anseth, K. S. "Photocurable polyanhydrides engineered for orthopedic applications", *Polymeric Materials Science and Engineering* 2000, 83, 566-567.
21. Wang, Y.; Ameer, G. A.; Sheppard, B. J.; Langer, R. "A tough biodegradable elastomer", *Nature Biotechnology* 2002, 20, 602-606.
22. Cheng, G.; Aponte, M. A.; Ramïrez, C. A. "Synthesis and characterization of amino acid-containing polyanhydrides for controlled drug release applications", *Polymeric Materials Science and Engineering* 2003, 89, 618-619.
23. Cheng, G.; Aponte, M. A.; Ramïrez, C. A. "Crosslinked amino acid-containing polyanhydrides for controlled drug release applications", *Proc. Int. Symp. Controlled Release Bioact. Mater.* 2003, 30, #391.
24. Bogert, M. T.; Renshaw, R. R. "4-Amino-o-phthalic acid and some of its derivatives", *J. Am. Chem. Soc.* 1908, 30, 1135-1144.
25. Sroog, C. E.; Endrey, A. L.; Abramo, S. V.; Berr, C. E.; Edwards, W. M.; Olivier, K. L. "Aromatic polypyromellitimides from aromatic polyamic acids", *Journal of Polymer Science, Part A: General Papers* 1965, 3, 1373-1390.
26. Sroog, C. E. "Polyimides", *Prog. Polym. Sci.* 1991, 16, 561-694.
27. Mittal, K. L. *Polyimides: Synthesis, Characterization, and Applications*, Plenum Press, New York, N.Y., 1984.
28. Feger, C.; Khojasteh, M. M.; McGrath, J. E., eds., *Polyimides: Materials, Chemistry and Characterization, Proceedings of the Third International Conference on Polyimides*, Ellenville, N.Y., Nov. 2-4, 1988, Elsevier Science Pubublishers BV; Amsterdam, The Netherlands, 1989.
29. Wilson, D.; Stenzenberger, H. D.; Hergenrother, P. M. *Polyimides*; Blackie & Son Ltd, Glasgow, Scotland, 1990.
30. Ghosh, M. K.; Mittal, K. L. *Polyimides: Fundamentals and Applications*; Marcel Dekker, Inc., New York, N.Y., 1996.
31. Bessonov, M. I.; Zubkov, V. A. *Polyamic Acids and Polyimides: Synthesis, Transformation, and Structure*; CRC Press: Boca Raton, Fla., 1993.
32. Smith, C. D.; Mercier, R.; Waton, H.; Sillion, B. "Solution hydrolytic stability of aromatic imide materials by fluorine-19 NMR", *Polymer Preprints (American Chemical Society, Division of Polymer Chemistry)* 1994, 35, 359-360.
33. Korshak, V. V.; Vinogradova, S. V.; Vygodskii, Y. S.; Gerashchenko, Z. V.; Lushkina, N. I. "Hydrolytic stability of some polyimides", *Vysokomolekulyarnye Soedineniya, Seriya A* 1972, 14, 1924-1928.
34. Richardson, R. R., Jr.; Miller, J. A.; Reichert, W. M. "Polyimides as biomaterials: Preliminary biocompatibility testing", *Biomaterials* 1993, 14, 627-635.
35. Kanno, M.; Kawakami, H.; Nagaoka, S.; Kubota, S. "Biocompatibility of fluorinated polyimide", *Journal of Biomedical Materials Research* 2002, 60, 53-60.
36. Stieglitz, T.; Meyers, J. U. "Implantable Microsystems. Polyimide-based neuroprostheses for interfacing nerves", *Med Device Technol* 1999, 10, 28-30.
37. Haggerty, H. S.; Lusted, H. S. "Histological reaction to polyimide films in the cochlea", *Acta Otolaryngology* 1989, 107, 13-22.
38. Amstutz, H. C.; Lodwig, M. "Wear of polymeric bearing materials: the effects of in vivo implantation", *Journal of Biomedical Materials Research* 1976, 10, 25-31.
39. Jesinger, R. A.; Stonick, V. I. In *IEEE Engineering in Medicine*, International Conference Proceedings, San Diego, Calif., 1993.
40. Buchman, A.; Payne, R. G.; Mendes, D. G.; Sibony, S.; Bryant, R. G.; M. M. A. Tech Ltd.: US 20030097182, 2003; p 13.

SUMMARY OF THE INVENTION

This invention overcame the problem of non-degradability of traditional polyimides, setting the stage for their use in a greater variety of applications, including, but not limited to, agricultural, biological, biomedical, pharmaceutical, and industrial.

More specifically, degradable polyimides were synthesized which are useful in a variety of agricultural, biomedical, and industrial applications. The polyimides in the present invention can be formed by polymerizing a monomer containing at least two anhydride groups, or a derivative thereof, and a monomer containing at least two primary amine groups and at least one acidic group, or a derivative thereof, in accordance with methods commonly employed in preparing non-degradable polyimides known to those skilled in the art. The polyimides are very strong in terms of their mechanical properties, yet degradable under standard physiological conditions. The degradability of the said polyimides may be taylored by judicious monomer selection and/or by chemical modification of the acidic functional groups at any of the side chains. The acidic groups may also be used to attach therapeutic agents or peptides via condensation reactions for drug release applications. The said polyimides, having one or more side chain acidic groups, may also be used as polymeric reagents, catalysts, and substrates.

A more complete appreciation of the invention and other intended advantages can be readily obtained by referring to the following detailed description of the preferred embodiments and claims, which disclose the principles of the invention and the best modes which are presently contemplated for carrying them out.

DETAILED DESCRIPTION OF THE INVENTION

Figure 1:
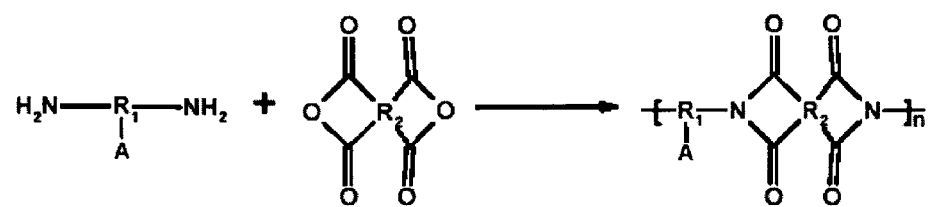
FIG. 1 is a schematic diagram showing one preferred method of synthesizing degradable polyimides.

Degradable polyimides were prepared which are useful in a variety of agricultural, biomedical, and industrial applications. The polymer in the present invention can be synthesized by reacting a monomer containing at least two anhydride groups, or a derivative thereof, and a monomer containing at least two primary amine groups and at least one acidic group, or a derivative thereof, in accordance with methods commonly employed in preparing non-degradable polyimides known to those skilled in the art. The overall reaction is illustrated in FIG. 1. In the structure shown, R1 and R2 represent unsubstituted/substituted aliphatic/aromatic groups of C1-C50, A stand(s) for one or more acidic groups.

The monomers containing at least two anhydride groups may be those used in the preparation of non-degradable polyimides, including, but not limited to, pyromellitic dianhydride (PMDA), 3,3',4,4'-biphenyltetracarboxylic dianhydride (BPDA), 3,3',4,4'-benzophenonetetracarboxylic dianhydride (BTDA), 3,3',4,4'-oxydiphthalic anhydride (ODPA), and 4,4'-hexafluoroisopropylidenebisphthalic anhydride (6FDA).

The monomers containing at least two amine groups and at least one acidic group (such as carboxylic acid or sulfinic acid) may be naturally occurring or synthetic amino acids (α, β-diaminopropionic acid, α, γ-diaminobutyric acid, ornithine, lysine, 2,5-diaminoadipic acid, 2,6-diaminopimelic acid, 2,6-diamino-4-hexenoic acid, 2,7-diaminosuberic acid, 2,8-diaminoazelaic acid, cystine, dicarboxidine, arginine, or asparagines) or other synthetic compounds containing at least two amino groups and one acid group, and derivatives/analogues thereof. When the said monomers are biologically active, polyimides with therapeutic properties or polymeric prodrugs may also result.

The properties of the polymer such as hydrophilicity/hydrophobicity, mechanical properties, and other properties may be taylored by judicious selection of monomers and polymerization conditions. For example, aliphatic diamino acids (such as lysine, ornithine, or cystine) may be used to prepare hydrophilic polyimides with fast degradation rates, while aromatic diamino compounds (such as 3,5-diaminobenzoic acid) may be used to increase the hydrophobicity of the polyimides, thereby slowing their degradation rates.

The said polyimides, having one or more acid groups (A), may be used as polymer reagents, catalysts, and substrates.

The physico-chemical properties and degradability of the said polymer may also be fine-tuned by chemical modification of the acidic groups on the side chains. For instance, transformation of the acid groups into ester or amide groups will increase the hydrophobicity and slow the degradation of the polymer. Polymeric prodrugs may also be prepared by attaching therapeutic agents or peptides to the side chains via chemical reaction (such as condensation or esterification). The said polyimides are tough and strong with adjustable degradability, and may be used in agricultural, biological, biomedical, pharmaceutical, and other industrial applications. Specific applications include, but are not limited to, orthopaedics, dentistry, controlled drug release, bio-coatings, bio-adhesives, tissue engineering, agricultural films, and food storage/packaging, to name a few.

The following non-limiting examples illustrate certain aspects of the invention. It is to be understood that the invention is not limited in its application to the details of construction and arrangement of the components set forth in the following description. The invention is capable of other embodiments or of being practiced or carried out in various ways. Also, it is to be understood that the phraseology and terminology herein is for the purpose of description and should not be regarded as limiting.

Materials

Lysine (99%, Acros), pyromellitic dianhydride (PMDA) (97%, Aldrich), acetic anhydride (97%, Fisher Scientific), and 1,1'-carbonyldiimidazole (97+%, Acros) were used as received. All other solvents (high performance liquid chromatography grade) and reagents (analytical grade), if not specified, were used as received from Acros or purified by distillation or recrystallization, if necessary.

Methods

Nuclear magnetic resonance (NMR) spectra were obtained with a Bruker AC-500 spectrometer (Bruker A G, Fällanden, Switzerland) or a Varian Gemini 300 FT-NMR spectrometer (Varian Inc., Palo Alto, Calif.) at room temperature in deuterated solvents. Infrared (IR) spectroscopy was performed on a Bio-Rad FTS 300MX spectrometer (Bio-Rad Laboratories Inc., Cambridge, Mass.). UV-Vis characterization was conducted on a Beckman DU Series 7000 UV-vis spectrometer (Beckman Instruments Inc., Fullerton, Calif.). Thermal analyses (differential scanning calorimetry, DSC, and thermal gravimetric analysis, TGA) were conducted on a simultaneous thermal analyzer (STA1500; Rheometric Scientific, Piscataway, N.J.) set at a heating rate of 10° C./min.

Polymer discs (0.200±0.001 g, 13.0±0.1 mm diameter, 1.20±0.05 mm thick) or cylinders (1.000±0.001 g, 8.0±0.1 mm diameter, 16.0±0.1 mm long) were prepared by compression-molding in a benchtop press (Carver Inc., Wabash, Ind.) by applying 5000 pounds per square inch for ten minutes at room temperature. Mechanical properties of the resulting polymers were measured using a universal material tester (MINIMAT 2000, Rheometric Scientific, Piscataway, N.J.). In vitro degradation studies were performed by placing the discs in Pyrex® bottles containing 200 ml of 0.1 M phosphate-buffered saline (PBS, pH=7.4, Sigma Chemical Co., St. Louis, Mo.). The bottles were placed in an incubator-shaker (Infors AG, Bottmingen, Switzerland) set at 37° C. and 100 rpm. The degradation was followed by mass loss of the polymer discs.

EXAMPLE

Preparation of PMDA-Lysine Polyimide 10 g lysine and 13.69 g PMDA were added to a flask containing 100 ml o-dichlorobenzene under a dry nitrogen gas atmosphere. 30 ml toluene were then added as an azeotropic solvent to remove water during the polycondensation. The reaction mixture was maintained at 180° C. for 4 hours until no more water was produced. The resulting viscous solution was then poured into excess ether, and the polymer powder was isolated by filtration. The precipitated polymer was washed several times with methanol and ether, and then dried under vacuum at 60° C. overnight. Yield: 96.0%.

The polyimide product was insoluble in ether and petroleum ether, partly soluble in alcohol, $CH_2Cl_2$ and $CHCl_3$, and soluble in tetrahydrofuran, dioxane, N,N-dimethylformamide, pyridine, m-cresol, and O-dichlorobenzene.

$^1$H-NMR (300 MHz, $C_4D_8O_2$): δ 8.31 (2H, ArH of PDMA), 4.88 (1H, 2-CH of lysine), 3.64 (2H, 6-$CH_2$ of lysine), 2.23 (2H, 3-$CH_2$ of lysine), 1.72 (2H, 5-$CH_2$ of lysine), 1.37 (2H, 4-$CH_2$ of lysine) ppm.

$^{13}$C-NMR (300 MHz, $C_4D_8O_2$): δ=169.64 (C=O of lysine), 166.31-165.86 (C=O, imide), 137.62-136.78 (1, 2, 4, 5-C of PMDA), 118.75-117.49 (3,6-C of PMDA), 52.25 (2-C of lysine), 38.01 (6-C of lysine), 28.27 (5-C of lysine), 27.83 (3-C of lysine), 23.86 (4-C of lysine) ppm.

FT-IR (ATR, cm-1): 1770 (asym C=O str, imide), 1707 (sym C=O str, imide), 1384, 1359 (C—N str).

UV-Vis (THF, m): 311, 319 (aromatic imide).

DSC/TGA: no Tg or Tm observed; Td=365° C.

The compression strength was 3.68 GPa.

The discs disappeared completely in PBS solution at 37° C. with 100 rpm after 6 hours. UV-Vis absorption at 310-320 nm, characteristic of aromatic imides, disappeared completely after 50 hours, indicating the degradation of the polyimides.

We claim:

1. A method of synthesizing a degradable polyimide by reacting a first monomer containing at least two anhydride groups, and a second monomer containing at least two primary amine groups and at least one acidic group, wherein said second monomer comprises at least one of: α, β-diaminopropionic acid, α, γ-diaminobutyric acid, ornithine, lysine, 2,5-diaminoadipic acid, 2,6-diaminopimelic acid, 2,6-diamino-4-hexenoic acid, 2,7-diaminosuberic acid, 2,8-diaminoazelaic acid, cystine, dicarboxidine, arginine, or asparagines.

2. The method of claim 1, wherein the the first monomer comprises at least one of: pyromellitic dianhydride, 3,3',4,4'-biphenyltetracarboxylic dianhydride, 3,3',4,4'-benzophenonetetracarboxylic dianhydride, 3,3',4,4'-oxydiphthalic anhydride, and 4,4'-hexafluoroisopropylidenebisphthalic anhydride.

3. The method of claim 1, wherein the synthesis occurs in a solvent.

4. The method of claim 3, wherein the solvent is selected from the group comprising o-dichlorobenzene, m-cresol, and toluene.

5. The method of claim 1, wherein the reaction is performed at 120° C.-200° C.

6. The method of claim 1, wherein said first monomer comprises unsubstituted/substituted aliphatic/aromatic groups of C1-C50.

* * * * *

UNITED STATES PATENT AND TRADEMARK OFFICE
CERTIFICATE OF CORRECTION

PATENT NO. : 7,427,654 B1  Page 1 of 1
APPLICATION NO. : 10/964480
DATED : September 23, 2008
INVENTOR(S) : Guanglou Cheng, Maria Aponte and Carlos A. Ramirez It is certified that error appears in the above-identified patent and that said Letters Patent is hereby corrected as shown below:

In the cover page, on the title item (54), "POLYMIDES" should be changed to --POLYIMIDES--.

In the cover page, "OTHER PUBLICATIONS" item (56), line 9: "Polymides" should be changed to --Polyimides--.

In the cover page, "OTHER PUBLICATIONS" item (56), line 13: "Polymides" should be changed to --Polyimides--.

In the cover page, "OTHER PUBLICATIONS" item (56), column 2, line 2: "Polymides" should be changed to --Polyimides--.

In the "OTHER PUBLICATIONS" item (56), page 2, line 1: "Polymides" should be changed to --Polyimides--.

Column 1, on the title: "POLYMIDES" should be changed to --POLYIMIDES--.

Signed and Sealed this

Thirty-first Day of March, 2009

JOHN DOLL
*Acting Director of the United States Patent and Trademark Office*